Figure 1:
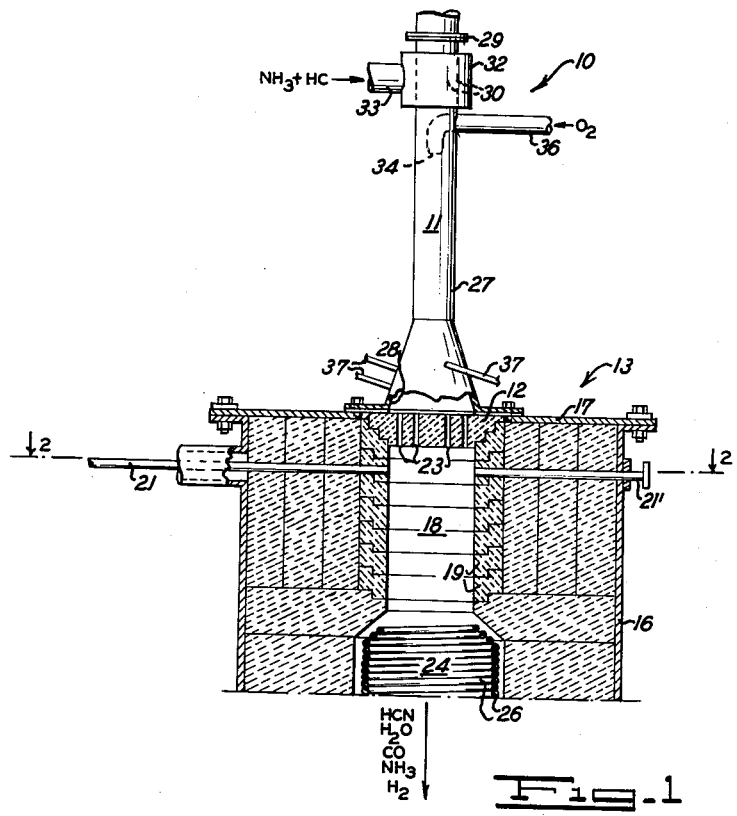

Nov. 13, 1962 SEIICHI FUJISE ETAL 3,063,803
TURBULENT FLOW FLAME SYNTHESIS OF HYDROGEN CYANIDE
Filed Sept. 6, 1960

INVENTORS
SEIICHI FUJISE
NOBUYA NAGAI
MASARO MITSUNAGA
TADAHIRO KOBAYAKAWA
BY

ATTORNEYS

United States Patent Office 3,063,803
Patented Nov. 13, 1962

3,063,803
TURBULENT FLOW FLAME SYNTHESIS OF
HYDROGEN CYANIDE
Seiichi Fujise, Kamakura City, Nobuya Nagai, Fujisawa
City, and Masaro Mitsunaga and Tadahiro Kobayakawa, Mobara City, Japan, assignors to Toyo Koatsu
Industries, Inc., Tokyo, Japan, a corporation of Japan
Filed Sept. 6, 1960, Ser. No. 54,176
Claims priority, application Japan Sept. 18, 1959
12 Claims. (Cl. 23—151)

The present invention relates generally to an improved chemical process and it relates more particularly to an improved process for the production of hydrocyanic acid and valuable gaseous by-products.

The methods heretofore employed in the synthesis of hydrocyanic acid from ammonia and a hydrocarbon particularly in the absence of a catalyst have possessed many drawbacks and disadvantages. The reaction between ammonia and a hydrocarbon is endothermic requiring relatively large quantities of heat. For example, the production of hydrocyanic acid from methane and ammonia requires over 60 kcal. per gram mol of hydrocyanic acid as indicated by the formula $$CH_4 + NH_3 = HCN + 3H_2 - 60.1 \text{ kcal.}$$

Furthermore, the temperatures necessary to permit the above reaction to proceed are very high. In the above reaction, the logarithm of the equilibrium constant $$Kp = (PHCN)(PH_2)^3/(PCH_4)(PNH_3)$$

is positive only when the temperature exceeds 1050° C. As a consequence, in order for the above synthesis to proceed satisfactorily the reaction temperature should be maintained at over 1100° C. and relatively large quantities of heat must be externally applied.

In British Patent No. 442,737, there is described a process in which the necessary heat for reacting ammonia and a hydrocarbon is supplied in part by preheating the gaseous reaction mixture and by employing in the gaseous reaction mixture an excess of hydrocarbon, over and above that amount which will consume all the oxygen present or react with ammonia. The combustion of the hydrocarbon furnishes some of the heat required for the reaction of the ammonia and hydrocarbon to produce hydrocyanic acid. Although this method of providing the necessary heat of reaction is theoretically highly advantageous there is no disclosure in the British patent of how the process may be safely and practicably initiated and continuously sustained with the excesses of hydrocarbon required. In order to start the reaction it is proposed that the reactant gases be preheated above their ignition temperatures and then passed into a combustion chamber, steps which possess explosive dangers and many other drawbacks in the sustenance and control of combustion. The process also requires the application of heat from an external source to initiate and/or sustain combustion and reaction.

In U.S. Patent No. 2,596,421 a process is described in which a hydrocarbon gas, ammonia and methane are reated in a combustion zone in the form of a thin disc-shaped flame which may or may not be surrounded by a separately formed auxiliary flame. The same inventor, in U.S. Patent No. 2,718,457 proposes preheating the reactant gases prior to combustion thereof by passing them in heat exchange relationship with the burned gases as the latter traverses a bed of particular material. In both of these patents the per hour production of hydrocyanic acid is limited and by-products resulting after separation of hydrocyanic acid and ammonia are of no practical value.

It is apparent from the above that the heretofore proposed methods of producing hydrocyanic acid leaves much to be desired. The use of the auxiliary flame or other combustion supporting arrangement is not only inefficient but also requires the use of complex equipment and close process control. Where the reactant gases are preheated, the apparatus is further complicated by the necessity of employing expensive construction materials since the hot reactant gases are highly corrosive. Another difficulty encountered in the preheating of the reactant gases is that ammonia tends to decompose at high temperature, particularly in the presence of metals.

It is thus a principal object of the present invention to provide an improved process for the production of hydrocyanic acid.

Another object of the present invention is to provide an improved process for the production of hydrocyanic acid.

Another object of the present invention is to provide an improved process for the simultaneous production of hydrocyanic acid and certain valuable and highly useful by-products.

A further object is the provision of a process and apparatus for producing hydrocyanic acid of the above nature, characterized by a high production rate and the provision of valuable by-products.

Still another object of the present invention is to provide an improved process of the above nature characterized by its high production efficiency and yield, the employment of simple and rugged equipment and the ease of process control.

Figure 2:
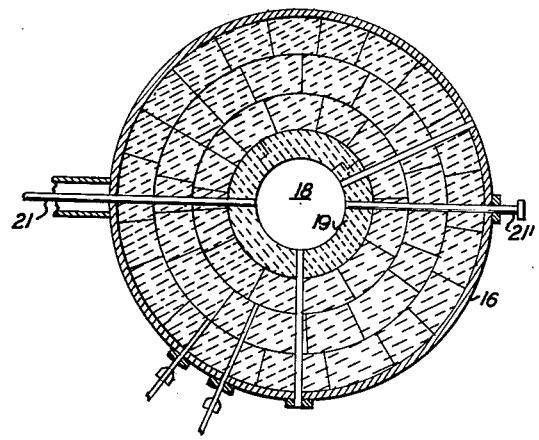

The above and further objects of the present invention will become apparent from a reading of the following description taken in conjunction with the accompanying drawing wherein:

FIG. 1 is a longitudinal cross-sectional view of an improved apparatus which may be employed in practising the present process, and FIG. 2 is a sectional view taken along line 2—2 in FIG. 1, partially broken away to show internal construction.

These objects are carried out by forming a stable, self-sustaining, turbulent flame in the state of turbulent streams from a gaseous mixture of oxygen, ammonia and a hydrocarbon. In a sense the present invention contemplates the provision of an improved method of producing hydrocyanic acid in which a mixture of reactant gases, including ammonia, oxygen and a hydrocarbon, are introduced at a relatively high velocity into an expanded reaction zone, burned in a turbulent flame in the reaction zone, traversing the reaction zone at a relatively lower velocity and thereby maintaining a self-sustaining combustion of the reactant gases. The reactant gases are introduced into the reaction zone in a turbulent flow, e.g., as produced by a jet-stream or streams having a linear velocity of between 40 and 80 meters per second. The reactant gases flow through the reaction zone at a linear velocity of between 1.0 and 3.0 meters per second, preferably between 1.5 and 2.0 meters per second. The length of the reaction zone should be such that the residence time of the reacting gases within the reaction zone is between 0.1 and 1.0 second. The term linear velocity, as employed herein, is calculated on the condition of the reactant gases in a standard state. The space velocity through the reaction zone, that is, the volume of gas in a standard state passing in one hour, per unit volume of reaction zone, ranges between 10,000 and 50,000 and preferably between 20,000 and 30,000. By employing the above operating conditions, an automatically self-sustaining combustion of ammonia, oxygen and a hydrocarbon can be continuously maintained with highly desirable and unexpected results including a high yield of hydrocyanic acid, hydrogen and carbon monoxide, the latter two gaseous by-products being very valuable in other chemical synthesis.

It is well-known that the combustion of ammonia, methane and oxygen, in the absence of a catalyst, normally produces water, carbon monoxide, hydrogen, carbon dioxide and hydrocyanic acid. It is highly desirable that the yield of hydrogen and carbon monoxide, as well as hydrocyanic acid, be high as compared to the other by-products. It has been found that the yield of hydrocyanic acid increases with an increase in the molar ratio of the hydrocarbon to the ammonia, the oxygen supply remaining constant, but that the capability of maintaining a self-sustaining combustion decreases with such an increase in the molar ratio and necessitates preheating the reactant gases or the use of an auxiliary flame. The absence of self-sustaining combustion results in an increase in the concentration of unreacted hydrocarbon and an undesirable decrease in the concentration of hydrogen and carbon monoxide in the effluent gaseous product.

It has also been found, contrary to expectations, that where the concentration of the ammonia and hydrocarbon is maintained constant, the oxygen concentration decreased, and the combustion maintained by preheating the reactant gases, the yield of hydrocyanic acid remains unchanged, but the yield of carbon monoxide and hydrogen fall appreciably. By employing a greater concentration of oxygen, not only is the automatic maintenance of a self-sustaining combustion of the reactant gases facilitated and the need for preheating or an auxiliary flame obviated, but a considerable increase in the yield of carbon monoxide and hydrogen is achieved. It has been found, from the above, that the molar ratio of the hydrocarbon to ammonia should be between 1.5:1 and 2.5:1, preferably about 2.0:1 and of the oxygen to hydrocarbon between 0.5:1 and 1:1, preferably about 0.8:1. The above molar ratios are based upon the number of mols of carbon in the hydrocarbon. The gram molecular weight of the hydrocarbon employed is divided by the number of carbons in the molecule to provide the gram molecular weight of the hydrocarbon based on the mols of carbon in the hydrocarbon which is then used to determine the mols of hydrocarbon in calculating the above-mentioned molar ratios. It should be noted that the oxygen is preferably employed in a substantially pure state, in the absence of large quantities of such gases as nitrogen so that the end products are in a relatively undiluted state permitting their easy separation and recovery.

As an example of the above, methane, oxygen and ammonia at the molar ratio of 2:1.6:1 was combusted, without preheating of the reactant gases or using an auxiliary flame, to convert between 54% and 60% of the ammonia to hydrocyanic acid and to decompose only 5% to 8% of the ammonia. The concentration of hydrogen and carbon monoxide after the removal of the hydrocyanic acid, condensed water and unreacted ammonia was about 90%. Inasmuch as the decomposition of the ammonia was small the yield of the hydrocyanic acid based upon the total amount of ammonia consumed and decomposed is thus between 85% and 90% and such yield is achieved by separating the unreacted ammonia from the reaction product and recycling the ammonia.

In effecting the above reaction in a self-sustaining manner, a cylindrical combustion chamber 0.3 to 0.4 meter long and provided with a plurality of vertically spaced injection nozzles has been employed. It should be noted that, although the gases of the above compositions have a low burning velocity of the order of 5 to 30 centimeters per second, self-sustaining combustion could be maintained in this apparatus at considerably higher, jet-stream velocities, e.g., up to 30 meters and more per second. Because of the length of the combustion zone there is little loss of hydrocyanic acid by hydrolysis and a large part of the water formed in the reaction is decomposed to provide hydrogen. However, inasmuch as hydrocyanic acid possesses a strong tendency to hydroylse at the reaction temperatures, e.g., 1200° C. to 1500° C., particularly at the hot surfaces of the combustion chamber, the reacted gases must flow directly from the combustion zone into a cooling zone to minimize such hydrolysis.

Referring now to the drawings which illustrate a preferred form of the improved apparatus which may be employed in practicing the present process the reference numeral 10 generally designates the improved apparatus which includes a gas mixing chamber 11, a burner block composed of a burner, jet block and assembly 12, a reaction or combustion furnace 13 and a post cooling chamber 24. The furnace 13 comprises a vertical cylindrical shell 16 formed of iron or the like and having a centrally apertured top wall 17 bolted to a flange carried by the shell 16. A tubular combustion zone 18 is disposed coaxially within the shell 16 and is surrounded by a cylindrical wall 19 built of a suitable refractory material capable of withstanding temperatures of at least 1500° C. and which is chemically and physically resistant to the action of the reaction gases including ammonia and hydrocyanic acid. This refractory material preferably has a high alumina content. The space between the wall 19 and the shell 16 is filled with any suitable high temperature heat insulating material to minimize heat losses. In order to initiate the reaction in the combustion zone 18 there is provided means for establishing a pilot flame in this zone, such means including a tube 21 extending radially through the furnace and chamber walls. A second similarly located tube 21' is also provided to afford visual access to the reaction zone 18 for inspection purposes.

Mounted on the top of the chamber wall 19 and forming the upper end of the combustion chamber 18 is a jet or burner block 12 having disposed therein a plurality of longitudinally extending bores which define nozzles 23. The burner block 12 may be of a suitable refractory material; however, it is advantageously formed of metal and is constructed with internal passages to permit the circulation of a coolant therethrough. It has been found that a highly stable flame may be established with the latter construction, spalling due to temperature changes eliminated and that the nozzles may be machined to close tolerances. Nozzles having an inner diameter of 1 to 2 centimeters each are advantageously employed.

The lower end of the reaction zone 18 communicates by way of an outwardly flared passageway with a cooling chamber 24 of cylindrical configuration and lined with boiler water tubes 26 of any suitable arrangement. The space between the tubes 26 and the outer shell 16 is also filled with a heat insulating material. Any desirable heat exchange medium is circulated through the tubes 26 to effect the cooling and stabilizing of the reaction products and the recovery of the heat thereof.

The gas mixing chamber 11 is detachably mounted atop the burner block 12, coaxial with the reaction chamber 18 and includes tubular member 27 having a downwardly and outwardly flaring bottom wall 28 terminating in an annular flange bolted to the top wall 17. The upper end of the tube 27 is closed by a replaceable safety plate 29 and a plurality of circumferentially spaced apertures 30 are set therein below the safety plate 29. An annular chamber 32 surrounds the apertures 30, communicating therethrough with the tube 27 and is sealed to the tube 27. The annular chamber 32 is connected to a source of a gaseous hydrocarbon and ammonia by way of a pipe 33. A downwardly directed gas injection nozzle 34 is located directly below the apertures 30 and is connected to a source of oxygen by way of a pipe 36 passing through the wall of tube 27. A plurality of tubular conduits and passageways 37 are provided at selected points in the apparatus to accommodate thermocouples, manometers and other instruments and to permit sampling for analysis and process control purposes.

The mixing chamber 11 may be formed of iron or other suitable metal and is of such dimensions as to permit a thorough mixing therein of the reactant gases and minimize the danger of flashback in case of accident.

The length of the combustion zone 18 is between 0.3 and 0.4 meter and the inner diameter of the nozzles 23 is between 1 and 2 centimeters. The various other dimensions and operating requirements are as above set forth. In operation, ammonia and a hydrocarbon gas are fed by way of the pipe 33, through apertures 30 into the tube 27 and these gases are mixed in a thoroughly turbulent flow with the oxygen delivered by way of the nozzle 34. The mixed gases then jet at a high velocity through the burner nozzles 23 and emerge and enter the burning gases in the chamber 18 in a turbulent flow. A self-sustaining combustion is thus maintained a short distance below the burner block 12 to effect the reaction of the present process, the reacted gases passing through cooling chamber 24 and out for further processing.

The following examples in which linear gas velocities are based upon the gas in a standard state are illustrative of the process of the present invention.

Example 1

A mixture of natural gas having a 97% methane content, oxygen of 99.7% purity and ammonia the molar ratio of methane to oxygen to ammonia being 2:1.63:1 was fed at a rate of 16.2 cubic meters per hour through nozzles into a combustion chamber lined with a high alumina refractory brick and heat insulated. The inner diameter of each nozzle was 10 millimeters and the linear velocity of the gases therethrough was about 58 meters per second. The combustion chamber was cylindrical, having an inner diameter of 55 millimeters and a length of 300 millimeters, the linear velocity of the gases therethrough being about 1.9 meters per second. Combustion of the gases was initiated by a pilot flame which was thereafter extinguished and a self-sustaining combustion was automatically maintained without any auxiliary flames or external heating. The temperature in the combustion zone ranged between 1,000° C. and 1,500° C. and the temperature in the combustion chamber between 5 and 8 centimeters below the burner block was at its maximum about 1,385° C.

Of the total ammonia fed 56% was converted to hydrocyanic acid and 7.7% was decomposed so that the hydrocyanic acid yield based on the amount of ammonia consumed and decomposed was 87.9%. The reaction gas per hour contained 6.20 cubic meters of water, 1.96 cubic meters of hydrocyanic acid and 1.23 cubic meters of unreacted ammonia which when separated left 13.95 cubic meters of residue gas containing 62.7% hydrogen and 27.0% carbon monoxide.

Example 2

There was delivered into a combustion chamber through a multijet burner block a mixture of 99.4% pure methane at 115 cubic meters per hour, 99.7% pure oxygen at 93 cubic meters per hour and ammonia at 53.5 cubic meters per hour. The burner block had 19 nozzles each having an inner diameter of 10 millimeters and the linear velocity of the gases therethrough was 50 meters per second. The combustion chamber was cylindrical, having an inner diameter of 0.25 meter and a length of 0.4 meter and of the same construction as that of Example 1. The linear velocity of the gases through the combustion chamber was 1.5 meters per second. Combustion was initiated by means of a pilot flame which was thereafter extinguished and combustion thereafter was self-sustaining.

Of the total ammonia fed 57.9% was converted to hydrocyanic acid and 6% was decomposed so that the yield of hydrocyanic acid based on the amount of ammonia consumed and decomposed was 90.7%. Upon removal of the hydrocyanic acid and unreacted ammonia the residual gas contained 136 cubic meters per hour of hydrogen and 57 cubic meters per hour of carbon monoxide and the overall purity for the hydrogen and the carbon monoxide totalled 90%.

Example 3

A mixture of propane of 99.3% purity, oxygen of 99.7% purity and ammonia, the molar ratio of propane to oxygen to ammonia being 0.667:1.41:1 was fed to the apparatus of Example 1 at a rate of 19.8 cubic meters per hour. The linear velocity in the combustion chamber was 2.3 meters per second and the space velocity 28,000. It should be noted that the molar ratio of the propane to oxygen to ammonia, based upon the number of carbons in the hydrocarbon is 2:1.41:1. As in Example 1 the combustion was initiated by the pilot flame and was thereafter self-sustaining.

54.7% of the total ammonia fed was converted to hydrocyanic acid and 4.6% was decomposed to produce a hydrocyanic acid yield of 92.1% based upon the amount of ammonia consumed and decomposed. The production rates were 3.56 cubic meters per hour of hydrocyanic acid, 2.64 cubic meters per hour of unreacted ammonia, 7.47 cubic meters per hour of water and 21.95 cubic meters per hour of the residual gas left upon removal of the hydrocyanic acid, unreacted ammonia and water, said residual gas containing 55.2% hydrogen and 33.6% carbon monoxide.

It should be noted that other hydrocarbons may be employed in place of or together with the methane and propane set forth in the above examples. These hydrocarbons should have relatively low boiling points, such as ethane, butane, pentane and hexane and are preferably gaseous at 25° C. Saturated and unsaturated aliphatic hydrocarbons having from 1 to 6 carbon atoms per molecule are advantageously used.

As many apparently widely different embodiments of this invention may be made without departing from the spirit and scope thereof, it is to be understood that the present invention is not limited to the specific embodiments thereof except as defined in the appended claims.

What is claimed is:

1. An improved chemical process for synthesizing hydrocyanic acid, comprising introducing a reactant gaseous mixture including ammonia, oxygen and a hydrocarbon under turbulent flow at a linear velocity of between 40 and 80 meters per second into a combustion zone, reducing the linear velocity of the gases in the combustion zone to between 1.0 and 3.0 meters per second and burning and reacting said gaseous mixture in said combustion zone at a temperature of at least 1000° C.

2. An improved chemical process for making hydrocyanic acid, comprising introducing a reactant gaseous mixture including ammonia, oxygen and a normally gaseous hydrocarbon under turbulent flow at a linear velocity of between 40 and 80 meters per second into a combustion zone, reducing the linear velocity of the gases in the combustion zone to between 1.0 and 3.0 meters per second and burning and reacting said gaseous mixture in said zone, at a temperature of at least 1000° C., the average residence time of the gaseous in the combustion zone being between 0.1 and 1.0 second.

3. An improved chemical process in accordance with claim 2 wherein the oxygen is at concentration sufficient to maintain the self-sustaining combustion in the absence of any preheating of the reactant gaseous mixture.

4. An improved chemical process in accordance with claim 2 wherein said reactant gases are introduced into said combustion zone through a water cooled metal nozzle.

5. An improved chemical process in accordance with claim 2 wherein said reactant gases are introduced into said combustion zone through a plurality of nozzles having inner diameters between 1 and 2 centimeters.

6. An improved chemical process in accordance with claim 2 wherein said combustion zone is between 0.3 and 0.4 meter long.

7. An improved chemical process in accordance with claim 2 wherein the space velocity of the gases through said combustion zone is between 10,000 and 50,000.

8. An improved chemical process in accordance with claim 2 where the reacted gases are cooled immediately upon emerging from said combustion zone.

9. An improved chemical process in accordance with claim 2 wherein the molar ratio of the hydrocarbon to the ammonia based upon the number of carbons in the hydrocarbon molecule is between 1.5:1 and 2.5:1.

10. An improved chemical process in accordance with claim 2 wherein the molar ratio of oxygen to the hydrocarbon based on the number of carbons in the hydrocarbon molecule is between 0.5:1 and 1:1.

11. An improved chemical process in accordance with claim 10 wherein the molar ratio of the hydrocarbon to the ammonia based upon the number of carbons in the hydrocarbon molecule is between 1:5:1 and 2:5:1.

12. An improved chemical process in accordance with claim 2 wherein said hydrocarbon is selected from the class consisting of the saturated and unsaturated aliphatic hydrocarbons having from 1 to 6 carbons.

References Cited in the file of this patent

FOREIGN PATENTS 816,731      Great Britain _____ July 15, 1959